United States Patent
Toyoshima et al.

(10) Patent No.: US 6,963,639 B2
(45) Date of Patent: Nov. 8, 2005

(54) PHONE APPARATUS HAVING REDIALING FUNCTION CAPABLE OF SURELY PREVENTING UNAUTHORIZED PERSON FROM INTERCEPTING STORED CONTENTS

(75) Inventors: Fumiyoshi Toyoshima, Tokyo (JP); Koichiro Kashiwagi, Tokyo (JP)

(73) Assignee: NEC Infrontia Corporation, Kanagawa (JP)

( * ) Notice: Subject to any disclaimer, the term of this patent is extended or adjusted under 35 U.S.C. 154(b) by 296 days.

(21) Appl. No.: 10/123,201

(22) Filed: Apr. 17, 2002

(65) Prior Publication Data

US 2002/0154758 A1 Oct. 24, 2002

(30) Foreign Application Priority Data

Apr. 18, 2001 (JP) ........................................ 2001-119969

(51) Int. Cl.[7] .............................................. H04M 1/00
(52) U.S. Cl. .............................. 379/355.02; 379/355.07
(58) Field of Search ....................... 379/355.01, 355.02, 379/355.05, 355.06, 355.07, 355.09, 356.01

(56) References Cited

U.S. PATENT DOCUMENTS

| | | | |
|---|---|---|---|
| 4,930,155 A | 5/1990 | Kurokawa | |
| 5,742,669 A | 4/1998 | Lim | |
| 5,956,395 A | 9/1999 | Song | |
| 6,049,723 A | 4/2000 | Park | |
| 6,198,815 B1 * | 3/2001 | Mishima | ................ 379/355.09 |

FOREIGN PATENT DOCUMENTS

| | | |
|---|---|---|
| JP | 3-078356 | 4/1991 |
| JP | 4-109741 | 4/1992 |
| JP | 8-321868 | 12/1996 |
| JP | 11-346260 | 12/1999 |

* cited by examiner

*Primary Examiner*—Minsun Oh Harvey
*Assistant Examiner*—Jefferey Harold
(74) *Attorney, Agent, or Firm*—Foley & Lardner LLP

(57) ABSTRACT

A phone apparatus having a redialing function comprises a memory, a redialing button, a digit setting button which is used for setting a maximum digit number of limiting the digit number of the redialing number and which makes the memory record the maximum digit number, and a controller which is used for controlling operations of the phone apparatus upon the maximum digit number stored in the memory so that the digit number of dialing made by the redialing button is limited to the maximum digit number.

13 Claims, 3 Drawing Sheets

PHONE APPARATUS HAVING REDIALING FUNCTION CAPABLE OF SURELY PREVENTING UNAUTHORIZED PERSON FROM INTERCEPTING STORED CONTENTS

BACKGROUND OF THE INVENTION

This invention relates to a phone apparatus having a redialing function of redialing a dialing number again.

Heretofore, a phone apparatus or set with a redialing function has been widely sold and used. In such a phone apparatus, a dial number of a called party is stored or stored in a memory (redialing memory) and is redialed to the same called party once after the dialing number is dialed to the called party or person.

In such a phone apparatus with the redialing function, it is necessary to prevent an unauthorized person from intercepting or stealing stored contents stored in a memory provided in the phone apparatus. Otherwise, a bank account number and/or a password might be informed and stolen by the unauthorized person by the use of the redialing operation. To this end, a telephone line or path is captured again after a speech or conversation is finished through the phone apparatus. Thereafter, a meaningless dial number is dialed to be rewritten on a previous dial number and to erase the previous dial number. Alternatively, stored contents dialed previously are saved into a cache or a peculiar memory by a preselected operation and can be read out of the cache memory only when a password or a key number is given to the memory.

For example, an existing phone apparatus having the redialing function comprises a hooking switch, a calling circuit, a handset, a ring generator, a designating signal transmitting circuit, a controller, a number display, a memory, a redialing button, and a dialing button.

The phone apparatus is connected to a telephone line. The hooking switch switches internal blocks provided in the phone apparatus. The controller controls operations of the phone apparatus. The number display displays stored contents such as a dialing number stored in the memory. The memory stores therein informations worked by the controller.

In the phone apparatus having the redialing function, a first dialing number is transmitted as a designating signal to the telephone line, is displayed on the number display, and is stored in the memory, by pushing the dialing button after off-hooking. Next time, a second dialing number is transmitted as a designating signal to the telephone line, is displayed on the number display, and is stored in the memory by newly pushing the dialing button 11 as like to the first dialing number. When a calling is finished by on-hooking the handset onto the hooking switch of the phone apparatus, the dialing number stored in the memory is stored as a redialing number in the memory. Hence, when the redialing button is pushed after off-hooking, the redialing number stored in the memory is read out by the controller, is transmitted as the designating signal to the telephone line, and is displayed on the number display.

In the existing phone apparatus having the redialing function, there is however a disadvantageous matter that regrettably the dialing number dialed can be easily intercepted by the redialing operation by an unauthorized person. For example, when the user uses a telephone bank cashing service with using the telephone apparatus, bank account and key numbers input through the phone apparatus are stored as the dialing number in the redialing memory. The unauthorized person can regrettably intercept, by only pushing the redialing button, the bank account and the key numbers.

Furthermore, as the prevention of the interception, the phone apparatus is operated as mentioned above. Namely, the user of the phone apparatus, after the use of the telephone bank cashing service, off-hooks again and dials a meaningless or an optional dial number so that the dialing number is rewritten on the bank account and the key numbers last stored in the redialing memory and that the bank account and the key numbers are deleted. Furthermore, the user operates the evacuating operation so that the bank account and the key numbers last stored in the redialing memory are evacuated to the evacuating memory previously provided in the phone apparatus. However, these operations are very troublesome, the user may forget how to surely operate an evacuating function, and therefore the unauthorized person can regrettably intercept the bank account and the key numbers. Therefore, the existing phone apparatus having the redialing function cannot surely prevent the unauthorized person from intercepting stored contents stored in the memory.

Another existing telephone apparatus having the redialing function capable of deleting the stored contents, telephone apparatuses are for example disclosed in Japanese Patent Unexamined Publications (A) Nos. 78356/1991 and 321868/1996.

SUMMARY OF THE INVENTION

It is therefore an object of this invention to provide a phone apparatus having a redialing function which can surely prevent an unauthorized person from intercepting stored contents in it's memory.

It is another object of this invention to provide a phone apparatus having a redialing function which is can perform by easy operation to prevent an interception of stored contents.

The other objects of this invention will become clear as the description proceeds.

According to an aspect of this invention, there is provided a phone apparatus having a redialing function comprising a memory for storing, as a redialing number, a dialing number that is input to the phone apparatus and that is transmitted from the phone apparatus to a transmission path during off-hooking, a redialing button for dialing the redialing number, a digit setting button for setting a maximum digit number of limiting the digit number of the redialing number, the digit setting button making the memory record the maximum digit number, and a controller for controlling operations of the phone apparatus upon the maximum digit number stored in the memory so that the digit number of dialing made by the redialing button is limited to the maximum digit number.

The other features and advantages of this invention will become clear as the description proceeds.

DESCRIPTION OF THE PREFERRED EMBODIMENT

In order to facilitate an understanding of this invention, description will at first be made an existing phone apparatus having the redialing function described in the background of this specification with reference to the drawings.

Figure 1:
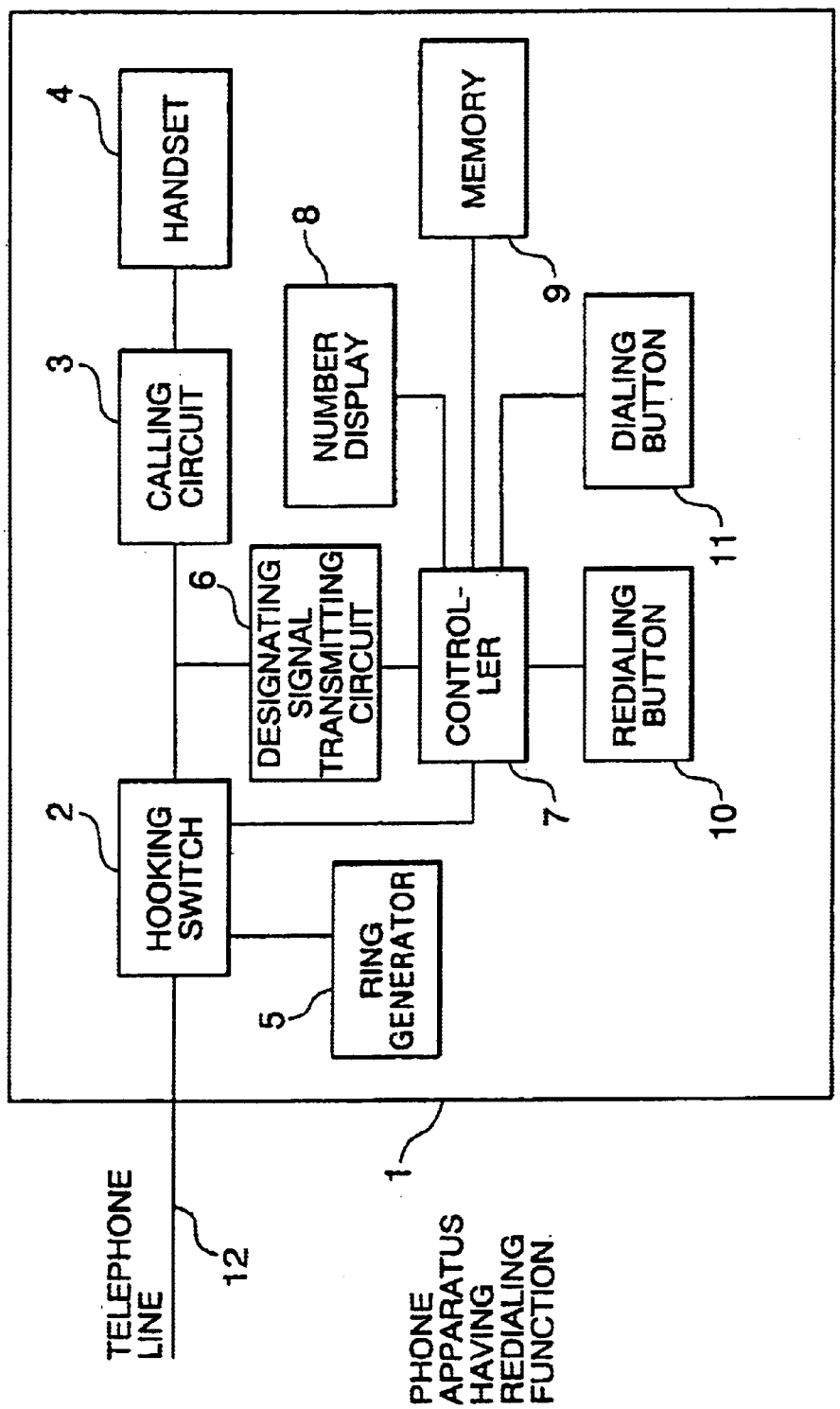
FIG. 1 is a block diagram of an existing phone apparatus having a redialing function.

Referring to FIG. 1, an existing phone apparatus 1 having the redialing function has a hooking switch 2, a calling circuit 3, a handset 4, a ring generator 5, a designating signal transmitting circuit 6, a controller 7, a number display 8, a memory 9, a redialing button 10, and a dialing button 11.

The phone apparatus 1 is connected to a telephone line 12 as a transmission path. The hooking switch 2 switches internal blocks provided in the phone apparatus 1. The calling circuit 3 concludes the telephone line 12 and controls receiving and transmitting audio signal. The handset 4 changes the receiving audio signal from the calling circuit 3 into receiving audio for the user of the phone apparatus 1 and changes transmitting audio from the use into the transmitting audio signal. The ring generator 5 changes a receipt signal through the telephone line 12 from the mating phone apparatus (not shown) into a ringing tone. The designating signal transmitting circuit 6 transmits a dialing information as a designating signal to the telephone line 12. The controller 7 controls operations of the phone apparatus 1. The number display displays stored contents such as a dialing number stored in the memory 9. The memory 9 stores therein information worked by the controller 7.

The telephone line 12 is connected to the hooking switch 2 while the hooking switch 2 is connected to the calling circuit 3, the ring generator 5, the designating signal transmitting circuit 6, and the controller 7. Furthermore, the calling circuit 3 is connected to handset 4 while the controller 7 is connected to the designating signal transmitting circuit 6, the number display 8, the memory 9, the redialing button 10, and the dialing button 11.

In the phone apparatus 1 having the redialing function, a first dialing number is transmitted as a designating signal to the telephone line 12, is displayed on the number display 8, and is stored in the memory 9, by pushing the dialing button 11 after off-hooking. Next time, a second dialing number is transmitted as a designating signal to the telephone line 12, is displayed on the number display 8, and is stored in the memory 9 by newly pushing the dialing button 11 as like to the first dialing number. When a calling is finished by on-hooking the handset 4 onto the hooking switch 2 of the phone apparatus 1, the dialing number stored in the memory 9 is stored as a redialing number in the memory 9. Hence, when the redialing button 10 is pushed after off-hooking, the redialing number stored in the memory 9 is read out by the controller 7, is transmitted as the designating signal to the telephone line 12, and is displayed on the number display 8.

The existing phone apparatus has problems described in the background.

Now, a preferred embodiment of this invention will be described with reference to the drawing.

Figure 2:
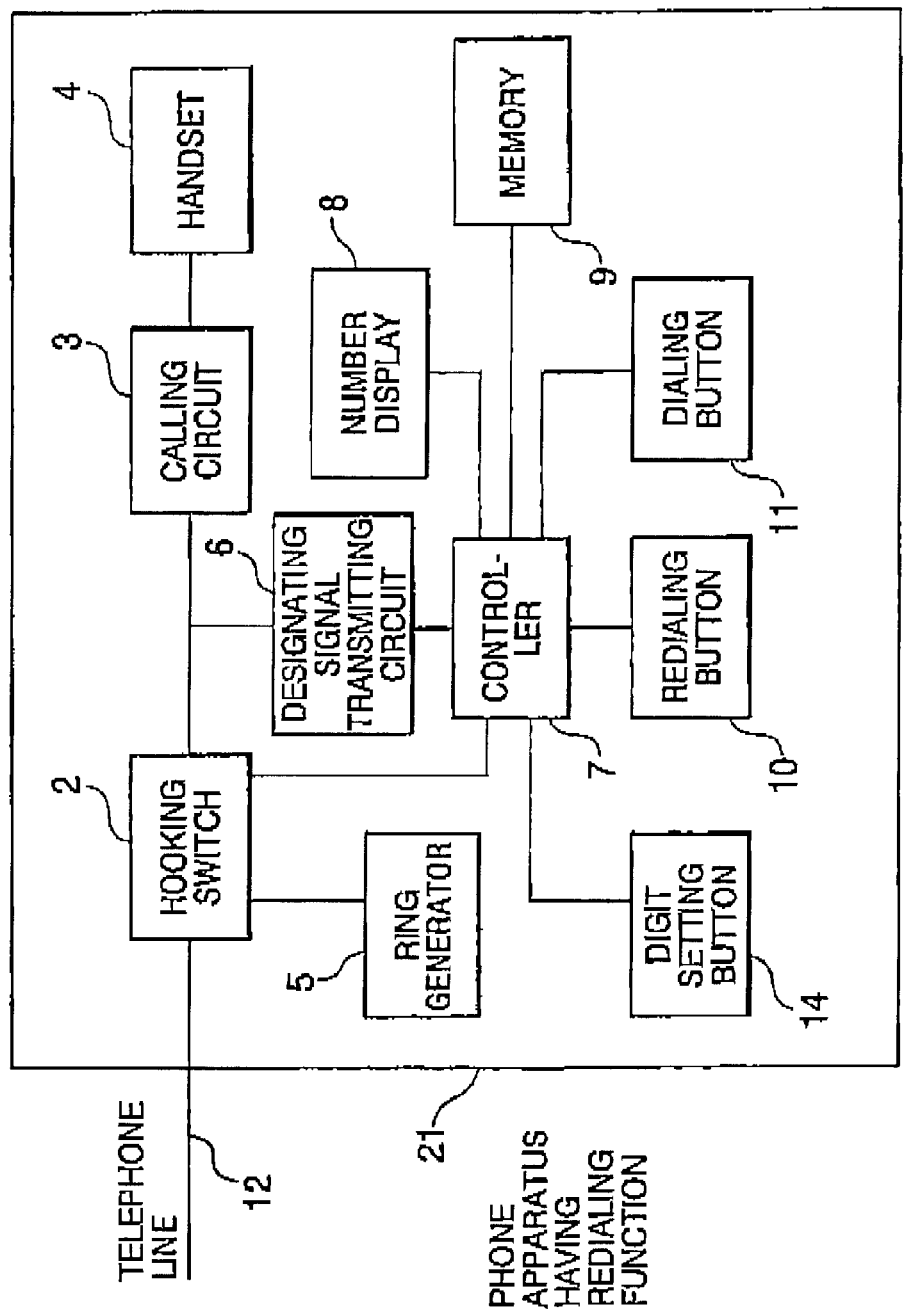
FIG. 2 is a block diagram of a phone apparatus having a redialing function according to an embodiment of this invention.

Referring to FIG. 2, a phone apparatus 21 having a redialing function according to an embodiment of this invention has a hooking switch 2, a calling circuit 3, a handset 4, a ring generator 5, a designating signal transmitting circuit 6, a controller 14, a number display 8, a memory 9, a redialing button 10, a dialing button 11, and a digit setting button 13. To some parts of the phone apparatus 21 like to the existing phone apparatus shown in FIG. 1, the same reference numbers are provided.

The phone apparatus 21 is connected to a telephone line 12 which is an analogue outside line. The hooking switch 2 switches internal blocks provided in the phone apparatus 21. The calling circuit 3 concludes the telephone line 12 and controls receiving and transmitting audio signal. The handset 4 changes the receiving audio signal from the calling circuit 3 into receiving audio for the user of the phone apparatus 21 and changes transmitting audio from the use into the transmitting audio signal. The ring generator 5 changes a receipt signal through the telephone line 12 from the mating phone apparatus (not shown) into a ringing tone. The designating signal transmitting circuit 6 transmits a dialing information as a designating signal to the telephone line 12. The controller 14 controls operations of the phone apparatus 21. The number display displays stored contents such as a dialing number stored in the memory 9. The memory 9 stores therein information worked by the controller 14.

The digit setting button 13 is used for setting a maximum digit number of limiting thereto the digit number of the redialing number. The digit setting button 13 prompts the memory 9 to record (makes the memory 9 record) the maximum digit number.

The telephone line 12 is connected to the hooking switch 2 while the hooking switch 2 is connected to the calling circuit 3, the ring generator 5, the designating signal transmitting circuit 6, and the controller 14. Furthermore, the calling circuit 3 is connected to handset 4 while the controller 14 is connected to the designating signal transmitting circuit 6, the number display 8, the memory 9, the redialing button 10, the dialing button 11, and the digit setting button 13.

In the phone apparatus 21 having the redialing function, when the dialing button 11 is pushed since the digit setting button 13 is pushed until the digit setting button 13 is again pushed during on-hooking (when communication is not performed), the controller 14 makes the memory 9 record the maximum digit number upon a numeral assigned to the dialing button 13.

Next, when the dialing button 11 is pushed during off-hooking (after hooking off the handset 4 from the hooking switch 2), the controller 14 makes the designating signal transmitting circuit 6 to transmit the dialing number input by the dialing button 11 as the designating signal to the phone line 12. Herein, the dialing number input by the dialing button 11 is also displayed by the number display 8 and stored as the redialing number in the memory 9. The following dialing number is transmitted as a designating signal to the telephone line 12, is displayed on the number display 8, and is stored in the memory 9 by newly pushing the dialing button 11 as like to the first dialing number.

When a calling is finished by on-hooking the handset 4 onto the hooking switch 2 of the phone apparatus 21, the controller 14 compares the maximum digit number with the digit number of the redialing number respectively stored in the memory 9. Upon the result of the comparison, the controller 14 makes the memory 9 record the redialing number only within the maximum digit number. Thus, when the redialing button 10 is pushed after off-hooking, the controller 14 makes the designating signal transmitting circuit 6 to transmit the dialing number limited within the maximum digit number as the designating signal to the phone line 12. At the same, the controller 14 makes the number display to display the dialing number limited within the maximum digit number.

Figure 3:
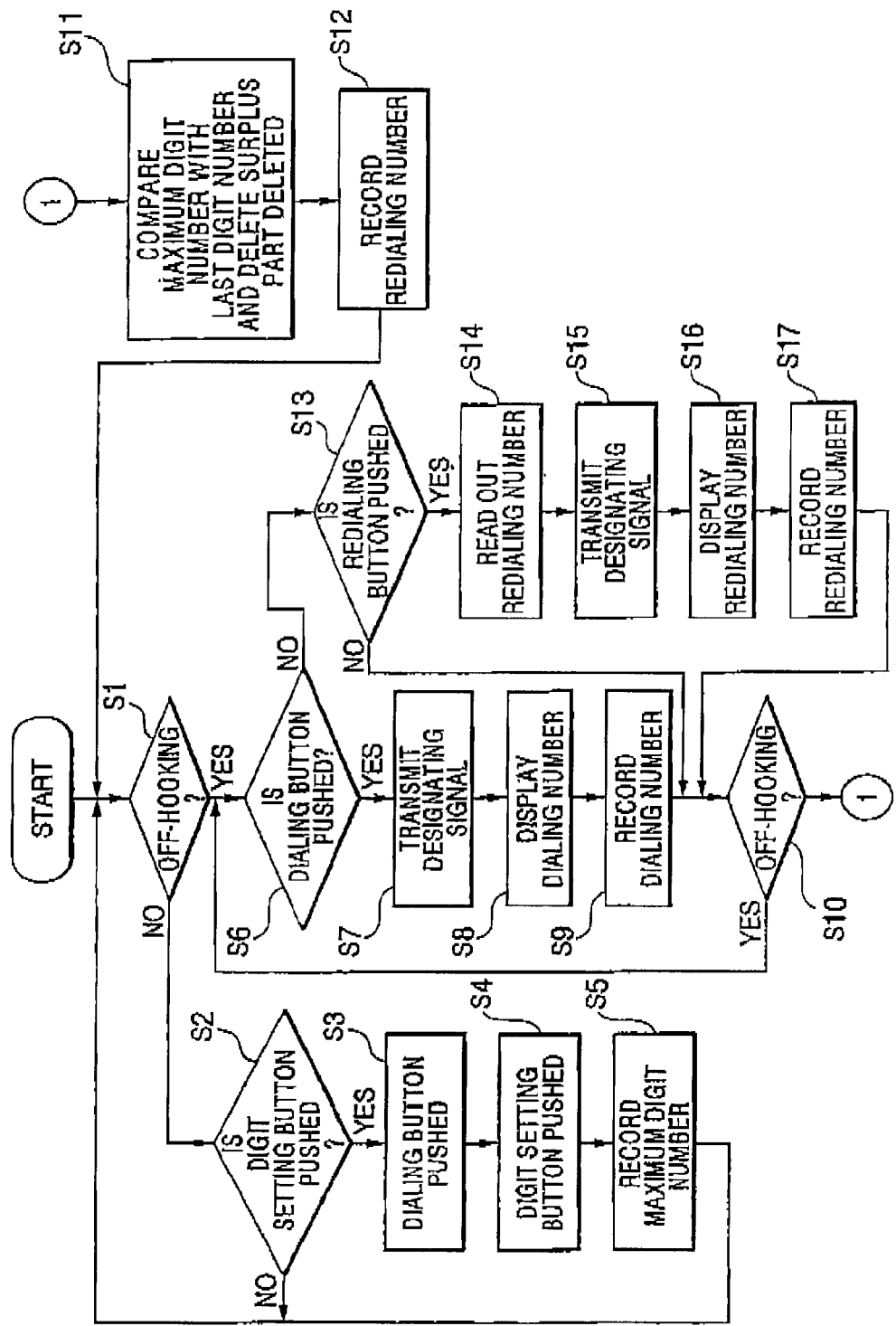
FIG. 3 is a flow chart for illustrating the operation of the phone apparatus shown in FIG. 2.

Now, the operations of the phone apparatus 21 having the redialing function by the control by the controller 14 will be described in detail with further referring to FIG. 3.

First, during on-hooking (the handset 4 is hooked on the hooking switch 2 (step S1)), after pushing the maximum digit setting button 13 (step S2), the maximum digit number is input to the phone apparatus 21 by pushing the dialing button 11 (step S3) and the maximum digit setting button 13 is pushed again (step S4). Thus, the maximum digit number for limiting the digit number of the redialing number is stored in the memory 9 (step S5).

Next, during off-hooking (the handset 4 is hooked off from the hooking switch 2 (step S1)), the telephone line 12 is concluded. Namely, the calling circuit 3 and the designating signal transmitting circuit 6 of the phone apparatus 21 are connected to the telephone line 12. At the same time, the controller 14 detects the off-hooking state upon the state of the hooking switch 2. When the dialing button 11 is pushed (step S6), the controller 14 detects the expression by pushing the dialing button 11 and makes the designating signal transmitting circuit 6 to transmit the dialing number as the designating signal to the phone line 12 (step S7). The dialing number is also displayed by the number display 8 (step S8) and stored as the redialing number in the memory 9 (step S9).

When a calling is finished and the handset 4 is hooked on the hooking switch 2 (the on-hooking state), the conclusion of the telephone line 12 is released. Namely, the calling circuit 3 and the designating signal transmitting circuit 6 of the phone apparatus 21 are disconnected from the telephone line 12. At the same time, the controller 14 detects the off-hooking state upon the state of the hooking switch 2 (step S10). The controller 14 compares the maximum digit number with the digit number of the redialing number respectively stored in the memory 9. Upon the result of the comparison, the controller 14 makes the memory 9 delete a surplus part of the redialing number corresponding to the digit number surpassing the maximum digit number (step S11) and record as the redialing number the dialing number only within the maximum digit number (step S12).

Next, during off-hooking (the handset 4 is hooked off from the hooking switch 2 (step S1)), the telephone line 12 is concluded. Namely, the calling circuit 3 and the designating signal transmitting circuit 6 of the phone apparatus 21 are connected to the telephone line 12. At the same time, the controller 14 detects the off-hooking state upon the state of the hooking switch 2. When the redialing button 10 is pushed (step S13), the controller 14 reads out the redialing number form the memory 9 (step S14) and output the redialing number to the designating signal transmitting circuit 6 and the number display 8. The designating signal transmitting circuit 6 transmits the redialing number as the designating signal to the phone line 12 (step S15). The number display 8 displays the redialing number (step S16). Furthermore, the memory 9 stores the redialing number (step S17).

Consequently, because the phone apparatus 21 having the redialing function excludes the surplus part of the radialing number corresponding to the digit number surpassing the maximum digit number, the phone apparatus 21 can surely prevent an unauthorized person from intercepting stored contents in the memory 9.

While this invention has thus far been described in conjunction with an embodiment thereof, it will now be readily possible for those skilled in the art to put this invention into practice in various other manners. For example, in the foregoing embodiments, the description has been directed to the case where the dialing button is used in order to inputting the maximum digit number to the phone apparatus upon a numeral assigned to the dialing button since the digit setting button is pushed until the digit setting button is pushed again during on-hooking. However, the input of the maximum digit number is never limited to this. For example, the controller may make the memory record, as the maximum digit number, only the digit number of a dialing number necessary assigned to a called phone apparatus. Furthermore, the controller may make the memory record, as the maximum digit number, the digit number except a dialing number for concluding the telephone line to make use of a telephone bank cashing service. The dialing number necessary assigned to a called phone apparatus or the state that the telephone line is concluded is known by the controller to receive a predetermined signal through the telephone line from the mating phone apparatus or a bane station.

Furthermore, although only the analogue outside line is used as the telephone line, the telephone line is never limited to this. For example, the phone line may include at leas one of line or network selected from the analogue telephone inside line, an ISDN (Integrated Services Digital Network), an ADSL (Asymmetrical Digital Subscriber Line), a LAN (Local Area Network), a WAN (Wide Area Network), and all kinds of wired or wireless telephone network.

Still further, although the phone apparatus for the analogue outside line is used as the phone apparatus, the phone apparatus is never limited to this. For example, the phone apparatus may be served by an inside telephone system comprising a telephone exchange and a terminal apparatus, a cordless phone apparatus, a cellular phone apparatus, or a facsimile apparatus.

What is claimed is:

1. A phone apparatus having a redialing function comprising:
    a memory for storing, as a redialing number, a dialing number that is input to said phone apparatus and that is transmitted from said phone apparatus to a transmission path during off-hooking;
    a redialing button for dialing said redialing number;
    a digit setting button for setting a maximum number of digits for limiting the number of digits for said redialing number, no more than said digit setting button making said memory record said maximum number of digits; and
    a controller for controlling operations of said phone apparatus upon said maximum number of digits stored in said memory so that the number of digits for of dialing made by said redialing button is limited to said maximum number of digits.

2. The phone apparatus according to claim 1, wherein said controller compares said maximum number of digits with the number of digits of said redialing number respectively stored in said memory, said controller dialing, when said redialing button is pushed, said redialing number only within said maximum number of digits.

3. The phone apparatus according to claim 1, wherein said phone apparatus further comprises a number display for displaying said redialing number;
    said controller controlling operations of said phone apparatus upon said maximum number of digits stored in said memory so that the number of digits of displaying by said number display is limited to said maximum number of digits.

4. The phone apparatus according to claim 1, wherein said phone apparatus further comprises a dialing button for inputting said dialing number to said phone apparatus to transmit the dialing number from said phone apparatus to the transmission path during off-hooking;

said dialing button being also used for inputting said maximum number of digits to said phone apparatus, when said digit setting button is pushed and is pushed again during on-hooking, upon a numeral assigned to said dialing button.

5. The phone apparatus according to claim 1, wherein said controller makes said memory record, as said maximum number of digits, only the number of digits of a dialing number assigned to a called phone apparatus.

6. The phone apparatus according to claim 1, wherein said controller makes said memory record, as said maximum number of digits, the number of digits except a dialing number again concluding the transmission path to make use of a telephone bank cashing service.

7. The phone apparatus according to claim 1, wherein said controller makes said memory delete a surplus part of said redialing number, said surplus part corresponding to the number of digits surpassing said maximum digit number.

8. The phone apparatus according to claim 1, wherein said phone apparatus further comprises a designating signal transmitting circuit for transmitting to the transmission path said dialing number or said redialing number as a designating signal for designating the mating phone apparatus.

9. The phone apparatus according to claim 1, wherein said phone apparatus further comprises a hooking switch inserted between said phone apparatus and the phone line, said hooking switch being switched during off-hooking so that said phone apparatus is connected to the transmission path and that the transmission path is again concluded.

10. The phone apparatus according to claim 1, wherein the phone line includes one selected from an analogue telephone line, an ISDN (Integrated Services Digital Network), an ADSL (Asymmetrical Digital Subscriber Line), and a LAN (Local Area Network).

11. A phone apparatus capable of carrying out a redial operation of redialing a telephone number of a predetermined number of digits as a redial number, comprising:

a digit setting button for setting a limited number of digits for the telephone number that is smaller than the predetermined number of digits;

a memory for storing the redial number; and a controller for controlling the redial operation so that the limited number of digits of the telephone number alone is redialed as the radial number.

12. The phone apparatus according to claim 11, wherein said memory stores, as the redial number, the telephone number of the predetermined number of digits;

said controller comparing a number of digits of the redial number stored in the memory with the limited number of digits to redial only the limited number of digits of the redial number when the digit setting button is operated.

13. The phone apparatus according to claim 11, wherein said memory stores, as the redial number, only the limited number of digits of the telephone number;

said controller carrying out the redial operation to redial only the limited number of digits of the redial number stored in said memory.

* * * * *